April 29, 1947.   E. S. TAYLOR ET AL   2,419,742
TOOL POST FOR CAPSTAN AND LIKE LATHES
Filed Jan. 25, 1945
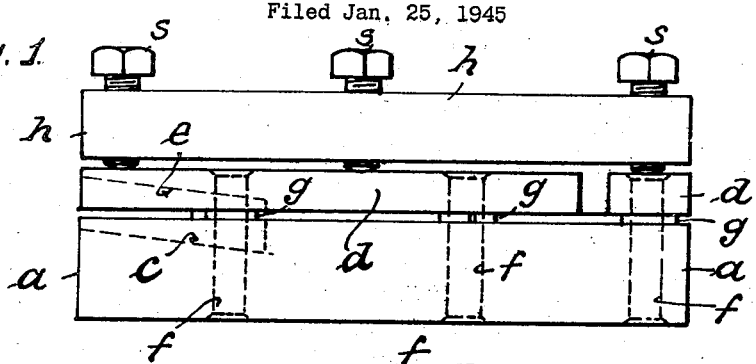
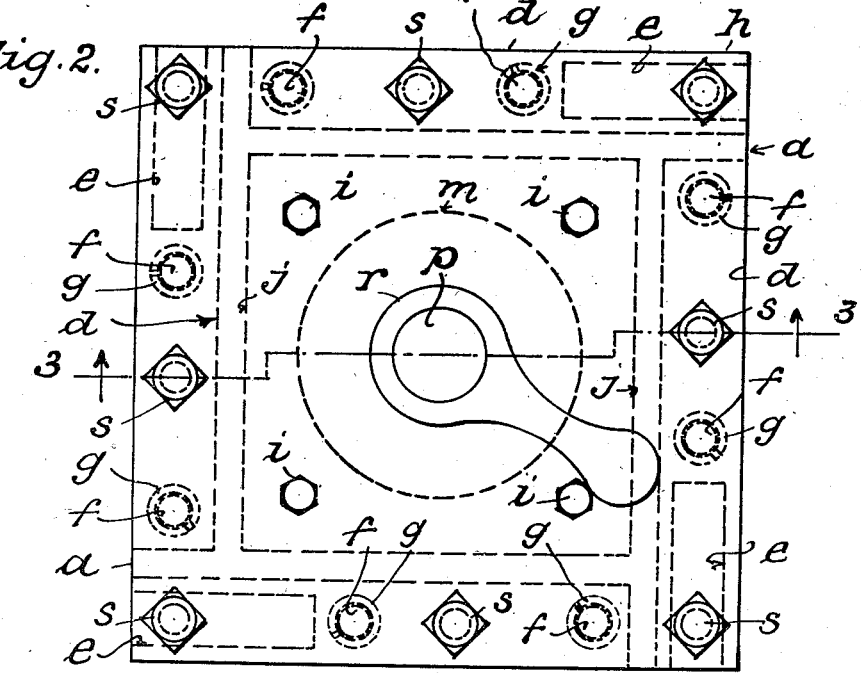
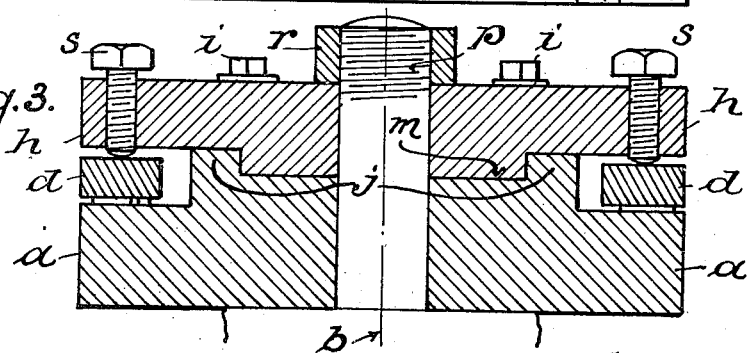
Inventors
Edward Stanley Taylor
Raymond Carlton Taylor
by Eugene S. Stevens
Their attorney Patented Apr. 29, 1947

2,419,742

UNITED STATES PATENT OFFICE 2,419,742

TOOL POST FOR CAPSTAN AND LIKE LATHES

Edward Stanley Taylor and Raymond Carlton Taylor, Honley, England

Application January 25, 1945, Serial No. 574,527
In Great Britain January 4, 1944

2 Claims. (Cl. 29—48)

Our invention relates to tool posts for capstan and like lathes wherein provision requires to be made for a plurality of tools spaced apart circumferentially.

A tool post according to the invention, arranged to accommodate four tools equally spaced apart circumferentially, is shown in the accompanying drawing, Fig. 1 being an edge view of the post, Fig. 2 a plan view; and Fig. 3 a section on the line 3—3 in Fig. 2.

The improved tool post comprises a base plate $a$, adapted to be adjusted circumferentially about a vertical axis $b$, and provided in its upper surface with a series of recesses $c$ so disposed, in the present instance, that the longitudinal axes of adjacent recesses are at right angles to one another. Obviously the number and disposition of the recesses may be varied to suit requirements.

Over each recess $c$ in the base plate $a$ we provide a gripping bar $d$, having in its underside a recess $e$ to co-operate with that in the base plate and accommodate between them a tool shank or tool bit with or without one or more shims or packing pieces.

Each gripping bar $d$ is connected to the base plate by pins or rivets $f$ on which the bar is slidable and between each bar and the base plate there are confined on the rivets $f$ springs or spring member $g$ which, when permitted to do so, function to raise the gripping bars away from the base plate to the limit permitted by the rivets $f$ and permit of insertion, removal, or re-positioning of the tools.

Extending over the gripping bars is a clamping plate $h$, conveniently corresponding in shape and size to the base plate $a$ and connected by screws $i$ to a central boss $j$ on the upper side of the base plate. A downward projection $m$ on the clamping plate, which enters a recess $n$ in the boss $j$, serves to locate the clamping plate on the base plate.

A screwed spindle $p$ extending up from a suitable support through central openings in the base plate and clamping plate, is provided at its upper end with a handle $r$, or it may be with a hand wheel, to enable the base plate and the parts carried thereby to be secured in any desired circumferential position relative to the support, so as to present any of the tools to the workpiece.

Over each gripping bar $d$ there extend, through suitable threaded openings in the clamping plate $h$, screws $s$ by means of which the gripping bars can be forced downwardly to grip their tools, or be permitted to be raised by their respective springs, for removal or adjustment of the tools.

The recesses $c$ and $e$, in the base plate and clamping plate respectively, are conveniently inclined, as shown, so that longitudinal adjustment of a tool in its recesses will raise or lower its cutting edge, and means may be provided to indicate the amount by which the cutting edge of a tool is raised or lowered for a given longitudinal adjustment as, for instance, by providing a suitable scale either on the base plate or on the gripping bar for the tool, or on the tool itself.

Having thus described our invention, what we claim as new and desire to secure by Letters Patent is:

1. A tool post for a capstan or like lathe comprising a base plate having in its upper surface a series of recesses, a tool-gripping bar disposed over each recess in the base plate and having in its underside a recess to co-operate with that in the base plate to accommodate and grip a tool between them, means connecting the gripping bars with the base in such manner as to permit of relative movements of approach of the bars towards and away from the base, springs acting to move the bars away from the base within permitted limits, a clamping plate extending over the gripping bars, means securing the said clamping plate to the base, screws working through threaded openings in the clamping plate and adapted to exert pressure on the gripping bars against the action of the springs, said base plate and clamping plate providing central interfitting circular boss and socket bearing means whereby they may be relatively adjusted, and means to secure the tool post in the desired position of circumferential adjustment, said recesses being disposed outwardly of said bearing boss and socket.

2. The structure of claim 1 further characterised in that the recesses in the base plate and clamping plate are inclined, so that longitudinal adjustment of a tool in its recess causes the cutting edge of the tool to be raised or lowered.

E. STANLEY TAYLOR.
R. CARLTON TAYLOR.

REFERENCES CITED

The following references are of record in the file of this patent:

UNITED STATES PATENTS

| Number | Name | Date |
|---|---|---|
| 890,838 | Brewer | June 16, 1908 |
| 1,058,656 | Bean | Apr. 8, 1913 |
| 1,479,526 | Wilkie | Jan. 1, 1924 |
| 2,319,644 | Strobl | May 18, 1943 |
| 211,378 | Cogswell | Jan. 14, 1879 |

FOREIGN PATENTS

| Number | Country | Date |
|---|---|---|
| 446,817 | France | Oct. 11, 1912 |